Feb. 14, 1967 J. S. APPLE 3,303,843

AMPLIFYING CIRCUIT WITH CONTROLLED DISABLING MEANS

Filed April 20, 1964

INVENTOR
JOSEPH S. APPLE
BY Arthur Freilich
ATTORNEY 3,303,843

AMPLIFYING CIRCUIT WITH CONTROLLED DISABLING MEANS

Joseph S. Apple, Canoga Park, Los Angeles, Calif., assignor to The Bunker-Ramo Corporation, Canoga Park, Calif., a corporation of Maryland Filed Apr. 20, 1964, Ser. No. 360,830
6 Claims. (Cl. 328—95)

Figure 1:
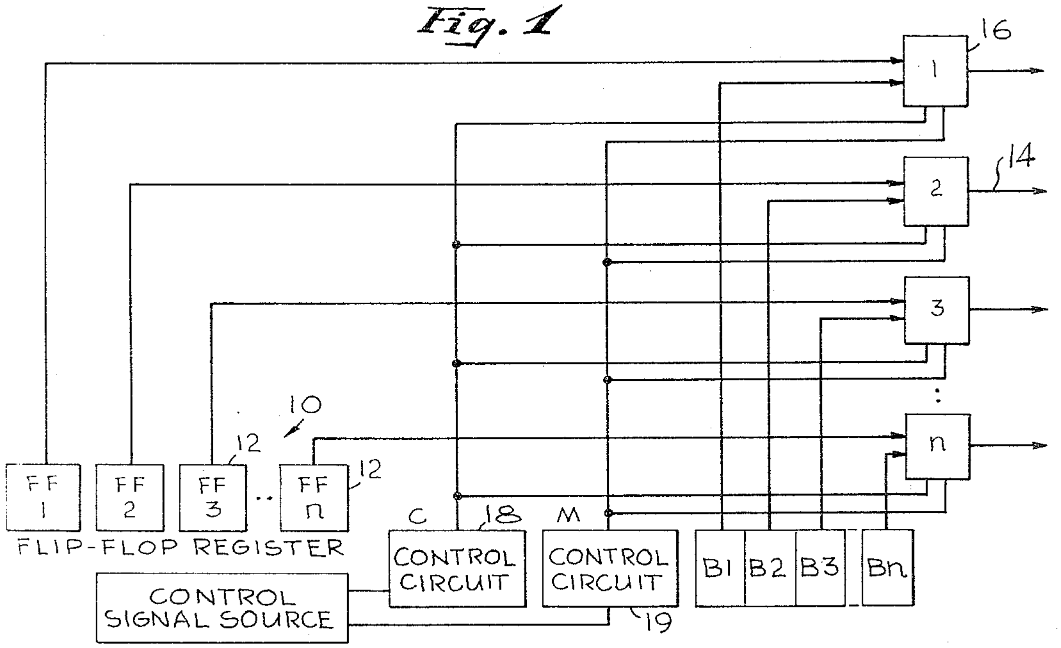

This invention relates generally to circuit apparatus particularly useful for coupling either a true or complementary binary state manifestation derived from a single terminal to a data transfer line.

Most known data processing and digital computer systems employ registers comprised of flip-flops having two output terminals which respectively provide true and complementary state manifestations. Because of the great number of register flip-flops normally employed in such systems, various attempts have been made to reduce flip-flop complexity and cost in order to reduce the overall system cost. One such attempt, as disclosed in U.S. patent application Serial No. 360,816 filed on April 20, 1964 by Joseph S. Apple, and assigned to the same assignee as the present application, has resulted in the provision of an extremely simple delay flip-flop circuit arrangement which can be used as a digital register stage. Although the circuit arrangement disclosed in the cited patent application has many advantages as compared with conventional flip-flop arrangements, one of its characteristics, i.e., it has only one output terminal, can in some instances be disadvantageous. For example, in performing certain arithmetic operations, such as subtraction, with respect to numbers stored in first and second registers, it is desirable to have the complement of one of the numbers available. If reasonably complex circuit apparatus has to be employed to develop such complements, then any cost reductions realized by simplifying the flip-flop circuits would be lost.

In view of this, it is an object of the present invention to provide a simple and inexpensive circuit arrangement for selectively providing at a single output terminal, true and complementary state manifestations derived from a flip-flop having a single output terminal.

It is an additional object of this invention to provide a circuit for selectively coupling either the true or complementary output of a register comprised of a plurality of single output terminal flip-flops to data transfer lines in response to the output of a single control circuit.

Briefly, in accordance with the invention, a logical input signal is coupled through an input circuit to either a first or second inverting amplifier stage dependent upon a logical signal provided by a binary control circuit. The first and second inverting amplifier stages are connected in tandem so that a signal applied to the first stage is inverted twice and appears in its true logical form at the second stage output terminal while a signal applied to the second stage is inverted only once and appears in its complementary form at the output terminal.

In addition to being able to complement numbers stored in registers, it is sometimes useful to be able to selectively mask certain bits stored in a selected register in accordance with the state of bits stored in a mask register. A valuable feature of the preferred embodiment of the present invention permits the incorporation of simple circuit means which allows bits being transferred out of a register to be masked in this manner.

Figure 2:
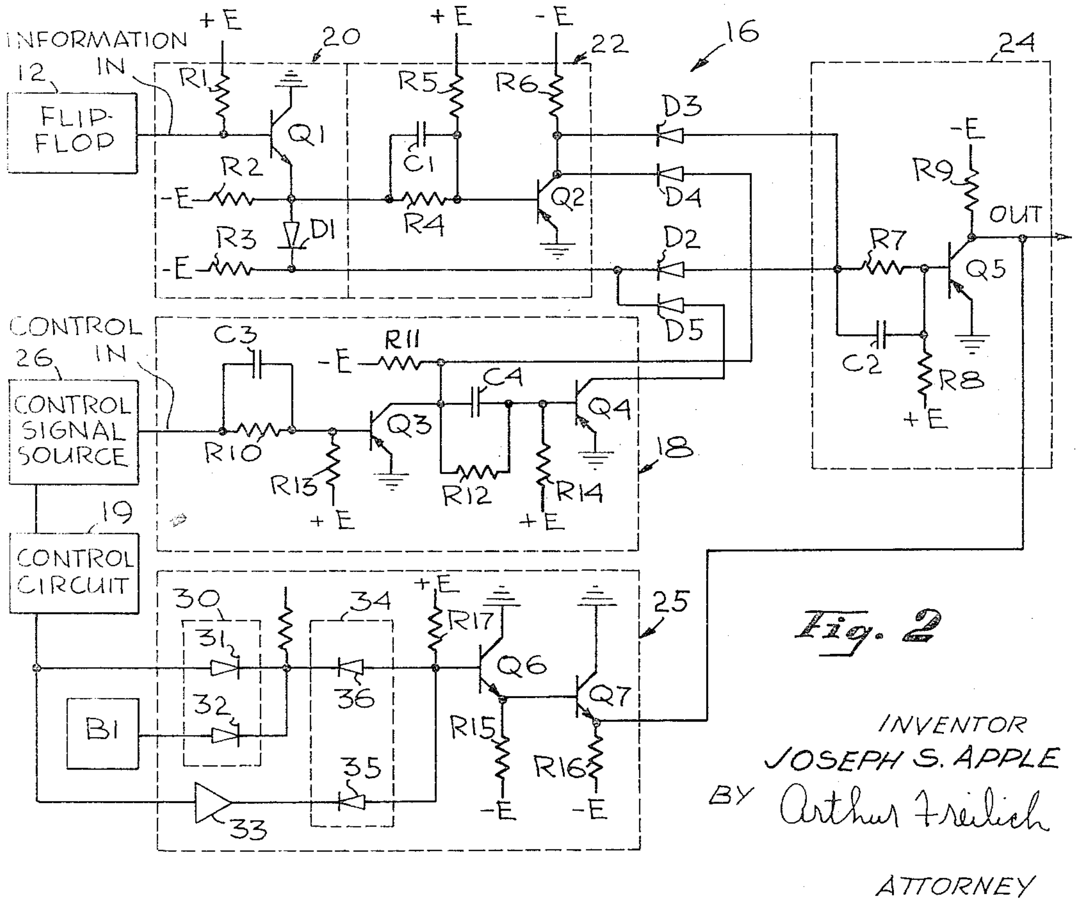

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram illustrating the amplifying circuit in accordance with the present invention coupling the stages of a flip-flop register to data transfer lines; and FIGURE 2 is a circuit diagram of a preferred embodiment of the present invention.

Attention is now called to FIG. 1 which illustrates a register 10 comprised of a plurality of flip-flops 12 each of which is adapted to be connected to a different data transfer line 14. Each of the flip-flops 12 is provided with a single output terminal which resides at a first voltage level to define a first binary state and at a second voltage level to define a second binary state. It is often desirable to selectively couple or mask either the true or complementary flip-flop state manifestation to the data transfer lines. In accordance with the invention, a different circuit 16 is connected between each flip-flop output terminal and a different data transfer line 14 for accomplishing such coupling. Each of the circuits 16 is responsive to the output of a binary complementing control circuit 18 such that when the control circuit 18 defines a first state, circuits 16 couple true state manifestations to the data transfer lines 14 while when the control circuit 18 defines a second state, the circuits 16 couple complementary state manifestations to the data transfer lines 14. In addition, a binary masking control circuit 19 is provided whose output terminal is also connected to circuits 16. When circuit 19 provides a true output signal, a manifestation representing the state of the corresponding masking or B register stage is coupled to the data transfer lines 14.

Attention is now called to FIG. 2 which illustrates a single circuit 16 controlled by the control circuits 18 and 19. The circuit 16 includes an input or non-inverting amplifier stage 20, a first inverting amplifier stage 22, a second inverting amplifier stage 24 and a masking stage 25. The output of the flip-flop 12 is connected to the information input terminal of the circuit 16 which is connected to the base or input electrode of an NPN transistor Q1 in the input stage 20. The base of transistor Q1 is connected through a resistor R1 to a source of positive potential (+E). The collector of transistor Q1 is connected to ground and the emitter or output electrode of transistor Q1 is connected both through resistor R2 and through diode D1 and gate resistor R3 to a source of negative potential (−E). It should be appreciated that transistor Q1 is thus connected as an emitter-follower.

The emitter of transistor Q1 is connected through a first path including a parallel circuit comprised of a current limiting resistor R4 and a speed-up capacitor C1 to the base of a PNP transistor Q2. The base of transistor Q2 is additionally connected through resistor R5 to a source of positive potential +E. The emitter of transistor Q2 is grounded and the collector thereof is connected through a resistor R6 to a source of negative potential −E. The emitter of transistor Q1 is connected through a second path to the base or input electrode of the second inverting amplifier stage Q5. More particularly, the cathode of diode D1 is connected to the cathode of a diode D2 whose anode is connected through a parallel circuit including a resistor R7 and a capacitor C2 to the base of transistor Q5. The collector of transistor Q2 is connected to the cathode of a diode D3 whose anode is also connected through the resistor R7 and the capacitor C2 to the base of the transistor Q5. The base of transistor Q5 is connected through a resistor R8 to a source of positive potential +E. The collector of transistor Q5 is connected through a resistor R9 to a source of negative potential −E while the emitter thereof is grounded. The collector of transistor Q5 defines the output terminal of the circuit 16.

The control circuit 18 includes an input terminal which is connected through a parallel resistor R10 and a capacitor C3 to the base of a PNP transistor Q3. A source 26 of binary control signals is connected to the control input terminal of the control circuit 18. The collector of transistor Q3 is connected through a resistor R11 to a source of negative potential and to the anode of a diode D4 whose cathode is connected to the collector of the transistor Q2. In addition, the collector of the transistor Q3 is connected through a parallel circuit including a resistor R12 and a capacitor C4 to the base of a PNP transistor Q4. The emitters of both transistors Q3 and Q4 are grounded. The bases of transistors Q3 and Q4 are respectively connected through resistors R13 and R14 to a source of positive potential +E. The collector of the transistor Q4 is connected to the anode of a diode D5 whose cathode is connected to the junction defined between the cathodes of the diodes D1 and D2.

The masking circuit 25 includes a pair of emitter-follower stages respectively including NPN transistors Q6 and Q7. The emitters of the transistors Q6 and Q7 are grounded and their collectors are respectively connected through resistors R15 and R16 to a source of negative potential —E. The base of transistor Q6 is connected through a resistor R17 to a source of positive potential +E and the base of the transistor Q7 is connected to the emitter of transistor Q6. The output of the control circuit 19 (which can be constructed similarly to circuit 18) and the output of stage one of the B register are connected through gates 30 and 34 to the base of the transistor Q6. Assuming that it is desired to mask the circuit output developed from the output of flip-flop 12 whenever the control circuit provides a masking signal M, the following equation can be implemented:

$$B1\cdot M+\overline{M}$$

That is, the output of transistor Q7 will be true whenever signal M is false or when signal M is true and the corresponding B register stage is true. When the output of transistor Q7 is true (—E), the circuit output available at the collector of transistor Q6 can be either true (—E) or false (Gnd.). When the output of transistor Q7 is false, the output at the collector of transistor Q6 will necessarily be false. AND gate 30, comprised of diodes 31 and 32, inverter 33 and OR gate 34, comprised of diodes 35 and 36, are used to implement the above logical equation.

Table I set forth below shows typical approximate values of the resistances and voltages employed in the circuit of FIG. 2. It should be understood that these values are set forth only for the purpose of facilitating an understanding of the present invention and the invention should not be construed as being limited thereto.

TABLE I $R1$=15K ohms
$R2$=1K ohms
$R3$=1K ohms
$R4$=8K ohms
$R5$=30K ohms
$R6$=1K ohms
$R7$=1K ohms
$R8$=7K ohms
$R9$=1K ohms
$R10$=1K ohms
$R11$=1K ohms
$R12$=1K ohms
$R13$=7K ohms
$R14$=7K ohms
$R15$=15K ohms
$R16$=1K ohms
$R17$=1K ohms
$E$=13.5 volts
"1"=—13.5 volts
"0"=Gnd.

Also, in order to enable the operation of the circuit of FIG. 2 to be better understood, Table II is provided hereinafter for illustrating the circuit operation in response to each of the possible information input, mask register, and masking and control input conditions.

TABLE II

| | IN | Control IN | Q1 | Q2 | Q3 | Q4 | Q5 | OUT | |
|---|---|---|---|---|---|---|---|---|---|
| (1) | 0 (Gnd) | 0 (Gnd) | On | Off | Off | On | On | 0 (Gnd) | $B\cdot M+\overline{M}$ |
| (2) | 0 (Gnd) | 1 (—E) | On | Off | On | Off | Off | 1 (—E) | |
| (3) | 1 (—E) | 0 (Gnd) | Off | On | Off | On | Off | 1 (—E) | |
| (4) | 1 (—E) | 1 (—E) | Off | On | On | Off | On | 0 (Gnd) | |
| (5) | 0 (Gnd) | 0 (Gnd) | On | Off | Off | On | On | 0 (Gnd) | $\overline{B}\cdot M$ |
| (6) | 0 (Gnd) | 1 (—E) | On | Off | On | Off | Off | 0 (Gnd) | |
| (7) | 1 (—E) | 0 (Gnd) | Off | On | Off | On | Off | 0 (Gnd) | |
| (8) | 1 (—E) | 1 (—E) | Off | On | On | Off | On | 0 (Gnd) | |

Table II, in lines 1–4, illustrate the conditions in the absence of masking (i.e. when M is false) or in the presence of masking (M, true) when the corresponding stage of the B register is false. Lines 5–8 illustrate the conditions in the presence of masking when the corresponding B register stage is true thereby always making the circuit output false. It can be seen in line 1 that when a "0" binary digit is applied to the information input terminal of circuit 16, a "0" binary signal will be provided at the amplifying circuit output terminal, unless a "1" binary signal is applied to the control input terminal of control circuit 18. In the event [line (2)] that a "1" binary signal is applied to the control input terminal, then the amplifying circuit 16 provides an output signal which represents the logical complement of the signal applied to the information input terminal by flip-flop 12. Similarly, when a "1" binary signal is applied to circuit 16, a "1" output signal will be provided [line (3)] only if a "0" signal is applied to the control circuit 18 and if a "1" signal is applied to the circuit 18 [line (4)], then a "0" output signal will be provided by circuit 16.

In the operation of the circuit of FIG. 2, in the presence of the conditions set forth in line 1 of Table II, a "0" or ground signal is applied to the information input terminal of circuit 16. As a consequence, the transistor Q1 will turn on. The emitter of transistor Q1 will thus be grounded which in turn will hold the transistor Q2 off. If a "0" or ground signal is also applied to the input of control circuit 18, the transistor Q3 will be held off which in turn will cause the transistor Q4 to conduct. Thus, the junction between the cathodes of the diodes D2 and D5 will be held at approximately ground. With both transistors Q2 and Q3 off, the potential at the collector of the transistor Q2 will be approximately —E thereby causing a negative potential to be reflected at the base of the transistor Q5. Thus, the transistor Q5 will be turned on and the output of the circuit 16 will be at ground potential representing a "0" binary signal.

If the flip-flop 12 again provided a "0" binary signal but the control signal source 26 then provided a "1" signal [line (2), Table II], the transistor Q3 would be turned on while the transistor Q4 would be turned off. As a consequence, the collector of the transistor Q2 would reside at approximately ground potential. Thus, the potential at the base of the transistor Q5 would also be held at substantially ground potential since the cathodes of the diodes D1 and D2 would be near ground as a consequence of the transistor Q1 being on. Thus, the transistor Q5 would be held off and the circuit 16 would thereby present a "1" output signal representing the complement of the signal applied to the input thereof.

Assume now that a "1" signal were applied to the input of the circuit 16. The transistor Q1 would be held off thus permitting the transistor Q2 to turn on. If a "0" signal is applied to the circuit 18 [line (3), Table II], the transistor Q3 is held off and the transistor Q4 is turned on. With the transistor Q2 on, and with the cathode of the diode D2 held at approximately ground potential, the base of the transistor Q5 will reside at approximately ground potential thereby holding the transistor Q5 off so that the output terminal of the circuit 16 provides a "1" output signal which corresponds to the input signal applied thereto. If a "1" signal were then applied to the input of the control circuit 18 [line (4), Table II], the transistor Q3 would be turned on and the transistor Q4 would be turned off. With both of the transistors Q1 and Q4 off, the potential at the cathodes of the diodes D1 and D2 will be approximately —E, thereby establishing a negative potential at the base of the transistor Q5 sufficient to turn on the transistor Q5. As a consequence, the output terminal of the circuit 16 will reside at approximately ground potential to thereby define a "0." Thus, it should be apparent that whenever a "1" binary signal is applied to the input of the circuit 18, the output terminal of the circuit 16 provides a signal which is the complement of the signal applied to the input thereof.

It should thus be appreciated that the control circuit 18 is binary in nature and when it defines a first state, that is with the transistor Q3 conducting, the output of the amplifier stage 22 available at the collector of the transistor Q2 is effectively clamped, so that the input signal applied to the input stage 20 of the circuit 16 is coupled directly to the inverting amplifier 24 to thus provide a complemented output signal. On the other hand, when the circuit 18 defines a second state, the transistor Q4 conducts to thereby clamp the direct coupling between the output of the input stage 20 and the inverting amplifier 24 to thus cause signal transmission through the inverting amplifier stage 22. The double inversion consequently caused by the amplifiers 22 and 24 of course causes a true representation to be provided at the output of circuit 16.

The discussion of the operation of the circuit of FIG. 2 has thus far assumed that the control circuit 19 either provided a false output signal indicating no masking or a true output signal with the corresponding stage of the B register being false. If the B register provides a false output signal when the signal M is true, then transistors Q6 and Q7 are turned on so that the circuit output is held at ground (false) regardless of any other conditions.

As illustrated in FIG. 1, control circuits 18 and 19 can be utilized to control a plurality of circuits 16 each of which can be coupled between a different flip-flop circuit 12 and a different data transfer line 14. It should further be appreciated that the output of each circuit 16 is suitable for directly driving subsequent gating circuits. It should also be appreciated that only a very small delay is introduced between the provision of the signal by a flip-flop 12 and the application of either the true or complementary representation of that signal to the data transfer lines.

From the foregoing, it should be appreciated that an extremely simple and inexpensive circuit arrangement has been provided herein for selectively coupling either the true or complementary representation of a binary signal available at a single input terminal to a single output terminal which output terminal can suitably drive subsequent diode type gates. In addition, it should be recognized that exceedingly simple means have been disclosed for enabling masking circuitry to suppress any other output signal when masking is desired. It should be understood that any component and voltage values mentioned herein are disclosed only for the purpose of facilitating an understanding of the invention and the invention should not be interpreted as being limited thereto.

The embodiments of the invention in which an exclusive property or privilege is claimed are defined as follows:

1. An amplifying circuit having an input terminal, a control terminal and an output terminal and being responsive to a control signal applied to said control terminal for selectively coupling either a logical signal applied to said input terminal or its logical complement to said output terminal, said amplifying circuit comprising:

a first inverting amplifier stage having an input terminal and an output terminal;

a second inverting amplifier stage having an input terminal and an output terminal;

means coupling said amplifying circuit input terminal to the input terminals of said first and second inverting amplifier stages;

means coupling said first inverting amplifier stage output terminal to said second inverting amplifier stage input terminal;

means coupling the output terminal of said second inverting amplifier stage to said amplifying circuit output terminal;

a source of first and second control signals; and control circuit means responsive to said first control signal applied to said control terminal for disabling said coupling between said amplifying circuit input terminal and said second inverting amplifier stage input terminal;

said control circuit means responsive to said second control signal for disabling said coupling between said first inverting amplifier stage output terminal and said second inverting amplifier stage input terminal.

2. The circuit of claim 1 including a non-inverting input amplifier stage comprising a first transistor having an input electrode and an output electrode;

a source of said logical signals coupled to said first transistor input electrode;

said first and second inverting amplifier stages respectively including second and third transistors each including an input electrode and an output electrode;

first and second conductive paths respectively connecting said first transistor output electrode to said second and third transistor input electrodes.

3. The circuit of claim 2 wherein said control circuit means includes means for clamping said first conductive path to a reference potential in response to said first control signal and for clamping said second conductive path to a reference potential in response to said second control signal.

4. In combination with a digital storage register comprised of a plurality of flip-flops, each flip-flop having a single output terminal, and a plurality of data transfer lines, a plurality of amplifying circuits each having an input terminal and an output terminal;

means connecting each of said amplifying circuit input terminals to a different flip-flop output terminal and each of said amplifying circuit output terminals to a different data transfer line;

a source of first and second control signals; and a control circuit means connected to said amplifying circuits and responsive to said first control signal applied to a control terminal thereof for causing said amplifying circuits to provide signals at the output terminals thereof each representing the logical complement of the state of the flip-flop connected to the input terminal thereof; each of said amplifying circuits including:

a first inverting amplifier stage having an input terminal and an output terminal;

a second inverting amplifier stage having an input terminal and an output terminal;

means coupling said amplifying circuit input terminal to the input terminals of said first and second inverting amplifier stages;

means coupling said first inverting amplifier stage output terminal to said second inverting amplifier stage input terminal;

means coupling the output terminal of said second inverting amplifier stage to said amplifying circuit output terminal;

said control circuit means being responsive to said first control signal applied to said control terminal for disabling said coupling between said amplifying circuit input terminal and said second inverting amplifier stage input terminal and being responsive to said second control signal for disabling said coupling between said first inverting amplifier stage output terminal and said second inverting amplifier stage input terminal.

5. In combination with a first digital storage register comprised of a plurality of flip-flops each flip-flop having a single output terminal, and a plurality of coupling circuits operative to couple each of said flip-flop output terminals to a different one of a plurality of data transfer lines, masking means for selectively inhibiting the operation of each of said coupling circuits, said masking means including:

a mask digital storage register comprised of a plurality of flip-flops each having a single output terminal;

a source of first and second mask control signals; and a plurality of mask control circuits each of which is connected to a different one of said coupling circuits and to a different one of said mask register flip-flop output terminals;

each of said mask control circuits responsive to said first mask control signal and to one state of the mask register flip-flop connected thereto for inhibiting the operation of the coupling circuit connected thereto.

6. The combination of claim 5 wherein each of said coupling circuits is operative to selectively apply a signal to the data transfer line coupled thereto which signal represents either the true or complementary state of the flip-flop coupled thereto;

each of said coupling circuits having an input terminal and an output terminal and including:

a first inverting amplifier stage having an input terminal and an output terminal;

a second inverting amplifier stage having an input terminal and an output terminal;

means coupling said coupling circuit input terminal to the input terminal of said first and second inverting amplifier stages;

means coupling said first inverting amplifier stage output terminal to said second inverting amplifier stage input terminal;

means coupling the output terminal of said second inverting amplifier stage to said coupling circuit output terminal;

a source of first and second control signals;

control circuit means responsive to said first control signal applied to said control terminal for disabling said coupling between said coupling circuit input terminal and said second inverting amplifier stage input terminal;

said control circuit means being responsive to said second control signal for disabling said coupling between said first inverting amplifier stage output terminal and said second inverting amplifier stage input terminal.

References Cited by the Examiner

UNITED STATES PATENTS

| | | | |
|---|---|---|---|
| 3,113,273 | 12/1963 | Tendick | 328—103 |
| 3,229,117 | 1/1966 | Chilton | 307—88.5 |

ARTHUR GAUSS, *Primary Examiner.*

B. P. DAVIS, *Assistant Examiner.*